United States Patent
Billsus et al.

(10) Patent No.: US 7,363,294 B2
(45) Date of Patent: Apr. 22, 2008

(54) INDEXING FOR CONTEXTUAL REVISITATION AND DIGEST GENERATION

(75) Inventors: Daniel-Alexander Billsus, San Francisco, CA (US); David M. Hilbert, San Jose, CA (US); Jonathan J. Trevor, Santa Clara, CA (US); Christopher D. Culy, Mountain View, CA (US); Laurent Denoue, Palo Alto, CA (US); Gene Golovchinsky, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 5 days.

(21) Appl. No.: 10/739,185

(22) Filed: Dec. 19, 2003

(65) Prior Publication Data

US 2005/0137996 A1    Jun. 23, 2005

(51) Int. Cl.
*G06F 17/30* (2006.01)
(52) U.S. Cl. ............................................. 707/3; 707/10
(58) Field of Classification Search .................... 707/3, 707/4, 10; 709/217, 218
See application file for complete search history.

(56) References Cited

U.S. PATENT DOCUMENTS

| | | | | |
|---|---|---|---|---|
| 5,428,735 A | * | 6/1995 | Kahl et al. .................. | 715/839 |
| 5,761,436 A | * | 6/1998 | Nielsen ....................... | 709/245 |
| 5,848,410 A | * | 12/1998 | Walls et al. .................... | 707/4 |
| 6,055,544 A | * | 4/2000 | DeRose et al. .......... | 707/104.1 |
| 6,292,796 B1 | * | 9/2001 | Drucker et al. ................. | 707/5 |
| 6,470,381 B2 | * | 10/2002 | De Boor et al. ............ | 709/217 |
| 6,557,015 B1 | * | 4/2003 | Bates et al. .............. | 715/501.1 |
| 6,571,256 B1 | * | 5/2003 | Dorian et al. ............ | 707/104.1 |
| 6,665,710 B1 | * | 12/2003 | Bates et al. ................. | 709/217 |
| 6,751,777 B2 | * | 6/2004 | Bates et al. .............. | 715/501.1 |
| 6,871,220 B1 | * | 3/2005 | Rajan et al. ................ | 709/218 |
| 6,983,272 B2 | * | 1/2006 | Davis et al. ................... | 707/3 |
| 2004/0267815 A1 | * | 12/2004 | De Mes ................... | 707/104.1 |

OTHER PUBLICATIONS

Dumais et al., "Stuff I've Seen: A System for Personal Information Retrieval and Re-Use" Microsoft Research, Aug. 1, 2003.
Kaptelinin, :UMEA: Translating Interaction Histories into Project Contexts, Paper: Integrating Tools and Tasks, vol. 5, Issue No. 1, pp. 353-360, Apr. 5-10, 2003.
Dumais et al. "Stuff I've Seen: A System for Personal Information Retrieval and Re-Use", Microsoft Research, Aug. 2003.
Barrett et al. "How to Personalize the Web" Proc. CHI 97, ACM, pp. 75-82, Jan. 1997.
Dashboard, http://www.nat.org/dashboard/, Jan. 2003.
Budzig et al. "Information Access In Context" Knowledge Based Systems 14 (1-2), pp. 37-53, Elsevier Science (2001).

(Continued)

*Primary Examiner*—Jean M. Corrielus
(74) *Attorney, Agent, or Firm*—Sughrue Mion PLLC; Pavel I. Pogodin (57) ABSTRACT

A medium, system and method of processing content information. In one exemplary embodiment, the medium, system and method include determining associated previously accessed content information in response to an action performed on a document containing information and based on a context of the information, and indicating to a user the determined associated content information.

57 Claims, 6 Drawing Sheets

OTHER PUBLICATIONS

Cockburn et al. "Improving WEB Page Revisitation : Analysis, Design and Evaluation" IT& Society 3(1), pp. 159-183 (2003).

Cockburn et al. "Webview: A Graphical Aid for Revisiting Web Pages" Proceedings of OZCHI '99 Australian Conference on Human Computer Interaction (1999).

Huynh, "A User Interface Framework for Supporting Information Management Tasks in Haystack." Master's Thesis, MIT, May 2003.

Kaptelinin, "UMEA: Translating Interaction Histories Into Project Contexts." Proceedings of SIGCHI conference on Human factors in computing systems (2003).

Li et al. "PowerBookMarks: A System for Personalizable Web Information Organization, Sharing, and Management" Proceedings of the Eighth International World-Wide Web Conference (1999).

Mani, "Automatic Summarization" John Benjamins New Series in Natural Language Processing (2001).

Marais et al. "Supporting Cooperative and Personal Surfing With a Desktop Assistant" Proceedings of ACM UIST '97, pp. 129-138 (1997).

Rhodes, "Just-In-Time Information Retrieval" PhD Dissertation, MIT Media Lab, (2000).

Van Rijsbergen, "Information Retrieval" (1979).

Wolber, "Exposing Document Context in the Personal Web" Proceedings of Internation Conference on Intelligent User Interfaces (IUI 2002), San Fransisco, CA. (2002).

* cited by examiner

INDEXING FOR CONTEXTUAL REVISITATION AND DIGEST GENERATION

BACKGROUND OF THE INVENTION

1. Field of Invention

This invention relates to processing previously accessed information.

2. Description of Related Art

Finding previously accessed information, such as, for example, web pages, email messages or documents, is one of the most frequent actions performed using computers. For example, recent studies suggest that up to four out of five web page visits are to previously accessed, e.g. previously seen, web pages.

There are a number of tools specifically designed for revisitation support. For example, some operating systems and computer applications frequently maintain a history of recently accessed files. Another example is that web browsers and several file managers support revisitation via a "back" button, a history of recently accessed files and URLs, as well as functions for creating and organizing bookmarks. In addition, another example involving web pages is that search tools are frequently used as revisitation tools.

SUMMARY OF THE INVENTION

Finding previously seen content is often challenging and time consuming. Despite the fact that revisiting content is such a prevalent and common activity, existing search tools focus on finding information, but not on revisiting previously accessed information.

Often, the reason for returning to previously seen content is to generate a new document. For example, creating a digest that collects and summarizes the most relevant resources and main findings of several days worth of web-based research might be performed for multiple reasons, such as sharing the findings with others, preparing reports, or collecting and storing sets of closely related resources for future reference.

The commonly used revisitation approaches have a number of drawbacks. For example, the back button used in web browsers and file managers only supports short-term document review. Navigation is typically purely sequential, which means that only recently visited pages and documents are reached conveniently. In addition, returning to a page and following a different path typically removes visited pages from the first path, making it impossible to reach all recently visited pages via the back button.

While File and URL history functions allow for more flexibility than a back button, skimming long lists of accessed files and URLs is not efficient or convenient. In addition, users must be able to associate a page title, URL or file name with information they are looking for, which is especially difficult if users are not aware of the origin of previously seen information, or if the page title is not informative. In addition, file access or URL histories are typically maintained on a per-application basis. For example, accessing web pages, reading email and opening documents typically results in three separate histories.

The main drawback of using bookmarks is that users must assess ahead of time if they are likely to have a future need for information contained in a page. Bookmarking pages very generously is often not a good solution, because the number of bookmarks and required organization to utilize them effectively becomes challenging on such a large scale. In general, the utility of bookmarks is directly related to the amount of work users are willing to invest in creating and maintaining them.

Because URLs, file names and directories are often hard to remember, search tools are frequently re-used to get back to previously seen content. However, there is typically no specific revisitation support available when using search tools. For example, searching for previously accessed web pages often involves rephrasing queries multiple times until a desired link is found. In addition, there is no guarantee that a previously accessed web page still exists.

Utilizing visited content to automatically generate digests, blogs or summaries is not well supported by tools available today. The process of collecting related resources to create digests or reports is largely a manual activity consisting of marking relevant content for future access, revisiting pages, finding the most relevant sections and/or summarizing the most important points, and then assembling a document that collects all the found information in one place. This is a very cumbersome process. None of the existing systems or tools are based on previously accessed content. They are primarily geared towards finding new information.

This invention provides methods and systems that use automatic content indexing and content retrieval techniques to assist users in revisiting previously accessed content.

This invention separably provides methods and systems that integrate automated content indexing with proactive query generation and recommendation capabilities to enable automated contextual access to previously seen content.

This invention separably provides methods and systems that use automatic indexing and retrieval techniques to generate focused digest documents based on previously accessed content.

This invention separably provides methods and systems that use automatic indexing and retrieval techniques to generate context-specific summaries of documents in a digest based on previously accessed content.

This invention separably provides methods and systems that provide for fully automated retrieval and summarization of previously seen or accessed resources to enable automated generation of contextually focused digests.

This invention separably provides methods and systems that automatically generate a full-text index of all content with which users interact during their common use of typical applications, such as, for example, a web browser, an email client, or a word processor.

In various exemplary embodiments involving a textual document, the systems and methods according to this invention proactively send currently displayed text to a server that adds the sent text to a full-text index. In various exemplary embodiments involving a textual document, the systems and methods according to this invention use a generated index to proactively determine or find previously accessed content closely related to a user's current context, such as, for example, a currently displayed web page, an email message received and/or displayed, edited, or the like.

This invention separably provides methods and systems wherein collections of retrieved documents are used for both content revisitation and digest generation.

BRIEF DESCRIPTION OF THE DRAWINGS

Various exemplary embodiments of the systems and methods of this invention will be described in detail below, with reference to the following figures, in which.

DETAILED DESCRIPTION OF PREFERRED EMBODIMENTS

Figure 1:
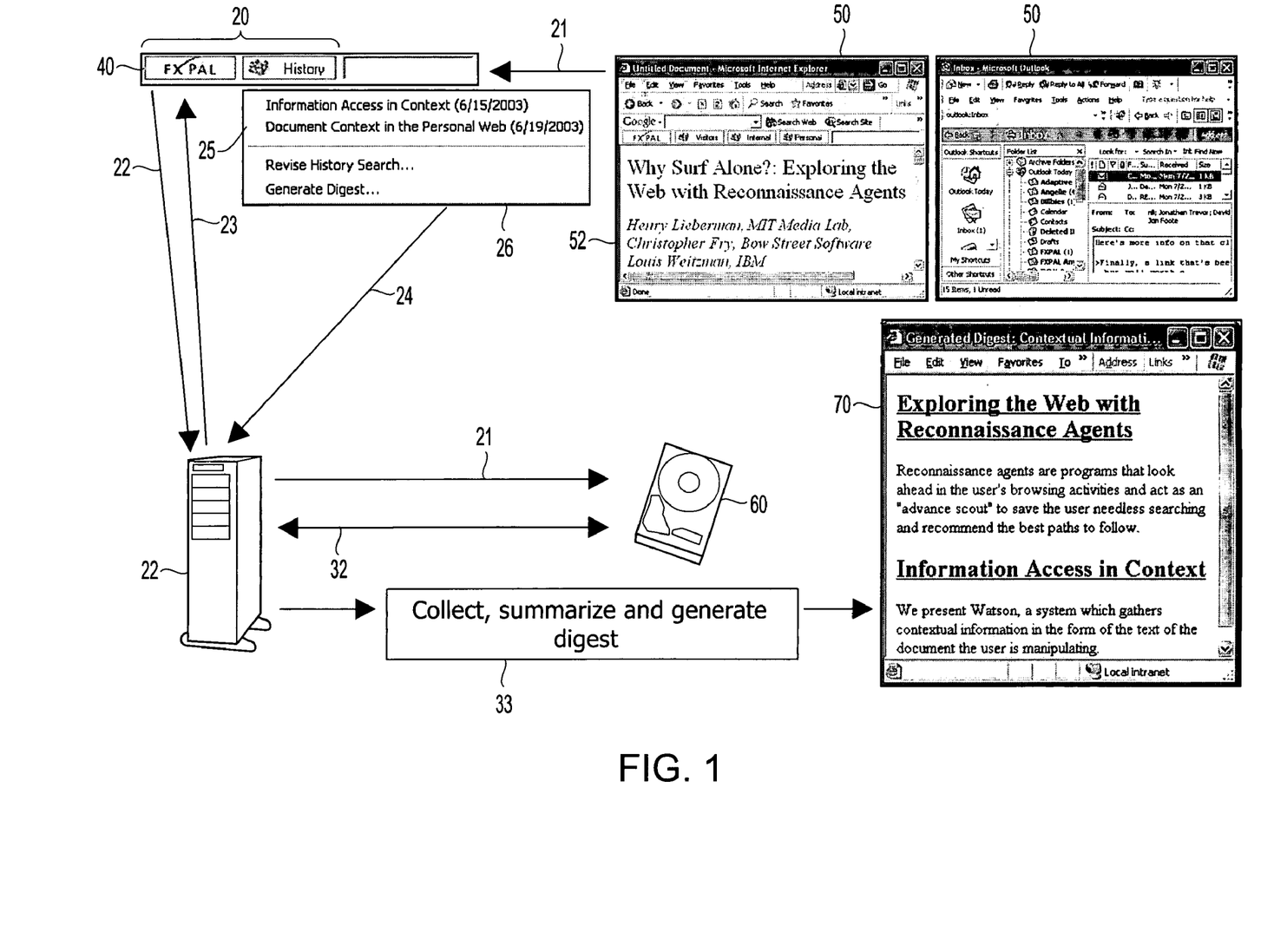
FIG. 1 is a high-level schematic representation of one exemplary embodiment of a method and system for revisiting previously accessed content and generating focused digest documents according to this invention.

FIG. 1 is a high-level schematic representation of one exemplary embodiment of the implementation of a method and system for revisiting previously accessed content and for generating focused digest documents based on previously accessed content according to this invention.

In various exemplary embodiments of the systems and methods according to this invention, content includes text, numbers, symbols, markings, meta data, or the like. Further, in various exemplary embodiments of the systems and methods according to this invention, content is part of a document such as, for example, a computer application document, a text message, an email message, a calendar entry, a web page, or the like. Moreover, in various exemplary embodiments of the systems and methods according to this invention, content is included within, or is itself, entire pages, individual text characters contained within a page, words, phrases, text-lines, sentences, paragraphs, columns of text, blocks of text, text articles, multi-page documents, collections of single-page documents, collections of multi-page documents, or the like.

In various exemplary embodiments of the systems and methods according to this invention, a system 10 employs indexing and retrieval techniques to assist one or more users in revisiting previously accessed content. The system 10 additionally employs indexing and retrieval techniques to generate focused digest documents based on previously accessed content. In various exemplary embodiments of the systems and methods according to this invention, these functions are performed automatically.

As shown in FIG. 1, in various exemplary embodiments, the system 10 employs at least two system modules. In these exemplary embodiments, the first system module is a client module 20. The client module 20 provides user interfaces for revisitation and digest generation. The second system module is a server module 30 that stores, indexes and retrieves content information and/or content documents to and from an index 60. In various exemplary embodiments, the index 60 is a full-text index.

In various exemplary embodiments, the client module 20 is embedded into any commonly-used applications 50, such as, for example, web browsers, email clients, presentation software, or word processors and the like. For example, as shown in FIG. 1, in various exemplary embodiments, in a graphical user interface (GUI) environment, the client module 20 is implemented as a toolbar 40 that is integrated within the user interface of the host application 50. In alternate exemplary embodiments, the client module 20 is implemented using any other known or later-developed method or technique.

In various exemplary embodiments, the client module 20 and the server module 30 are installed on the same host computing device, for example, a single desktop computer, such as when a standalone single user setup is desired. Alternatively, in various exemplary embodiments, the client module 20 and the server module 30 are installed on separate host computing devices, such as, for example, when the system 10 is to support multiple users from the same server system.

In various exemplary embodiments, multiple users connect to the server module 30 from multiple different systems, such as, for example, mobile devices, multiple desktops, personal digital assistant devices, mobile computing and communication devices, using a network environment. Enabling multiple users to access the same server module 30 via multiple devices is advantageous because it enables the users to access the same content history regardless of the type of processing device, application, and/or communication link used.

In various exemplary embodiment, the client module 20 performs various functions, selected from a list including, but not limited to, extracting text 21 from one or more accessed documents 52 developed using commonly-used productivity applications 50, proactively transmitting 22 the extracted text to the server module 30, proactively notifying the user 23 of the existence of closely related previously accessed content found, providing an electronic connection 24 to closely related previously accessed content found, providing an explicit history 25 of the user's content found, accessed and/or retrieved, providing a menu 26 including a digest generation component used to specify a digest to be generated by the server module 30, and the like functions.

In various exemplary embodiments, the server module 30 stores and indexes 31 the currently displayed text in to an index 60. In various exemplary embodiments, the server module 30 searches, for example, performs queries 32 of, the index 60 to determine previously accessed content that is closely related to the user's current context. In various additional exemplary embodiments, the server module 30 generates a digest 33 of documents 70 according to the user's specifications.

Figure 2:
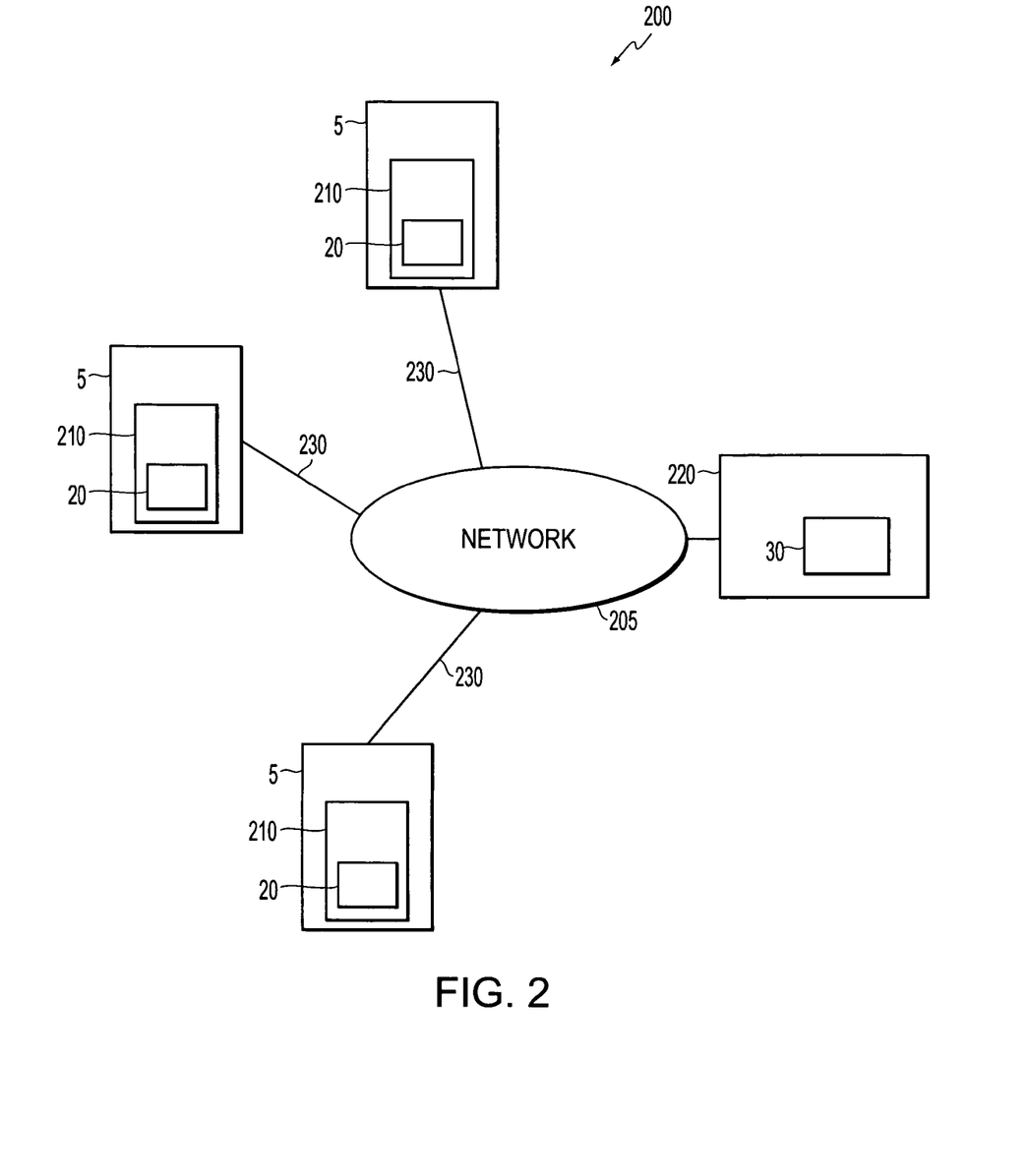
FIG. 2 shows one exemplary embodiment of a network environment for use in connection with the methods and systems according to this invention.

FIG. 2 schematically shows one exemplary embodiment of a network environment 200 for use in connection with the systems and methods according to this invention. As shown in FIG. 2, a content revisitation and digest generation system is configured to be used in an environment having multiple users 5. In various exemplary embodiments of the multi-user environment, the network environment 200 is arranged such that each single user 5 has a computing device 210 that includes a client module 20. In various exemplary embodiments, the server module 30 is included in a standalone computing device 220, such as a server device. In various alternative exemplary embodiments (not shown), the server module 30 resides in one of the computing devices 210 of the users 5. In various exemplary embodiments, each of the users 5 is connected to the server module 30 of the content revisitation and digest generation system over a network 205 using one or more communication links 230.

In various exemplary embodiments, the network 205 includes, but is not limited to, for example, a local area network, a wide area network, a storage area network, an intranet, an extranet, the Internet, or any other type of distributed network. In various exemplary embodiments, the network 205 includes wired and/or wireless portions. In various exemplary embodiments, the link 230 is any known or later developed device or system for connecting various components of the content revisitation and digest generation system, such as, for example, the client module 20 and the server module 30, to the network 205, including a connection over public switched telephone network, a direct cable connection, a connection over a wide area network, a local area network or a storage area network, a connection over an intranet or an extranet, a connection over the Internet, or a connection over any other distributed processing network or system. In general, the link 230 can be any known or later-developed connection system or structure usable to connect various components of the content revisitation and digest generation system, such as, for example, the client module 20 and the server module 30, to the network 205.

Figure 3:
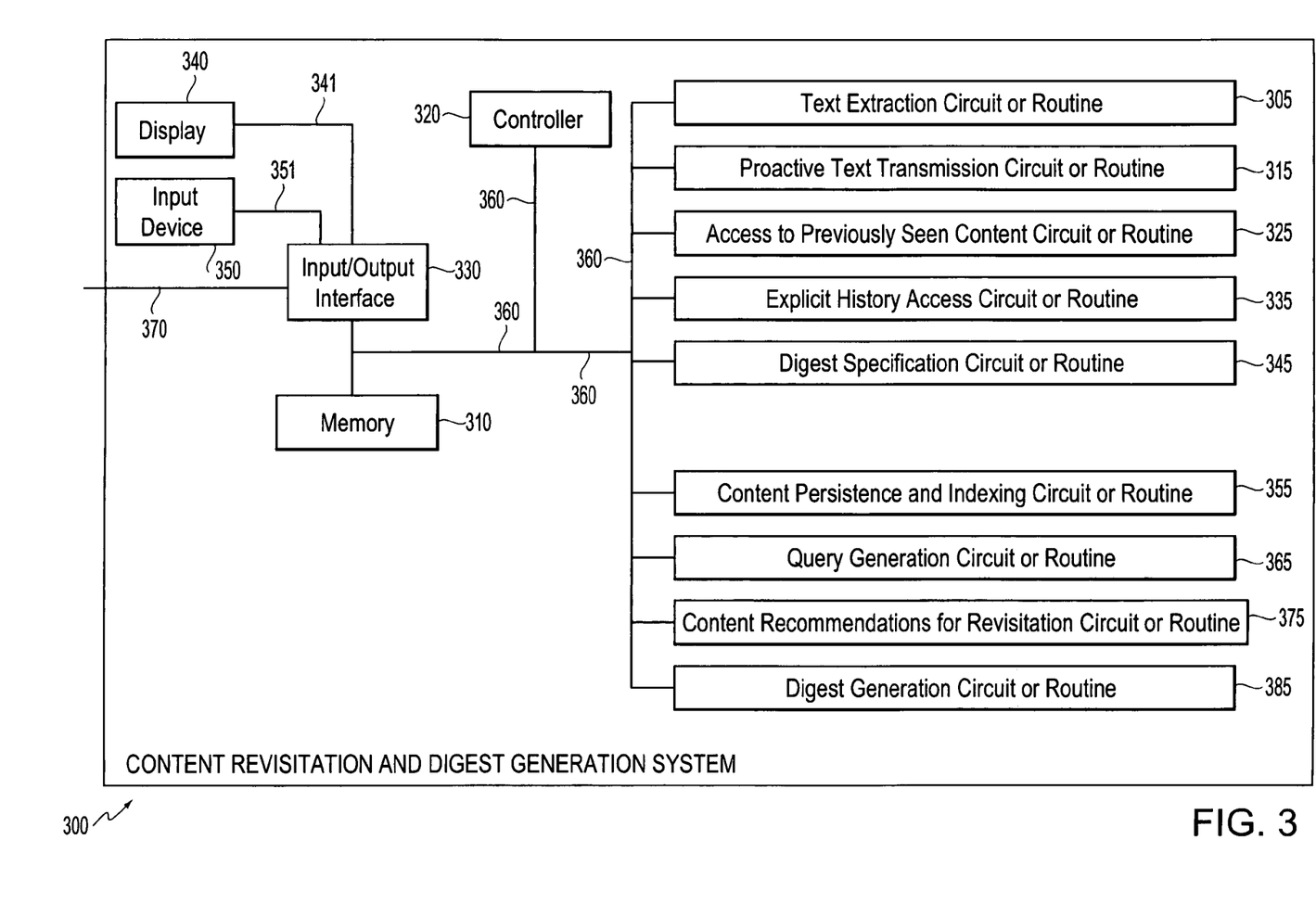
FIG. 3 is a functional block diagram of one exemplary embodiment of a system for revisiting previously accessed content and generating focused digest documents according to this invention.

FIG. 3 is a functional block diagram of one exemplary embodiment of a system 300 for revisiting previously accessed content and generating focused digest documents according to this invention. The system 300 includes an exterior data connection 370. In various exemplary embodiments, data connection 370 is any known or later developed device or system for connecting the system 300 to the exterior, such as, for example, to the network 205, including a connection over public switched telephone network, a direct cable connection, a connection over a wide area network, a local area network or a storage area network, a connection over an intranet or an extranet, a connection over the Internet, or a connection over any other distributed processing network or system. In general, data connection 370 is any known or later-developed connection system or structure usable to connect the system 300 to the exterior, such as, for example, to the network 205.

As shown in FIG. 3, the system 300 includes one or more display devices 340 usable to display information to a user, and one or more user input devices 350 usable to allow the user or users to input data into the system 300. The one or more display devices 340 and the one or more input devices 350 are connected to the system 300 through an input/output interface 330 via one or more communication links 341 and 351, respectively. The one or more communication links 341 and 351 are generally similar to the data connection 370 above.

In various exemplary embodiments, the system 300 includes one or more of a controller 320, a memory 310, a text extraction circuit or routine 305, a proactive text transmission circuit or routine 315, an access to previously seen content circuit or routine 325, an explicit history access circuit or routine 335, a digest specification circuit or routine 345, a content persistence and indexing circuit or routine 355, a query generation circuit or routine 365, a content recommendation for revisitation circuit or routine 375, and a digest generation circuit or routine 385, all of which are interconnected over one or more data and/or control buses and/or application programming interfaces 360.

In various exemplary embodiments, the controller 320 controls the operation of the other components of the system 300. In various exemplary embodiments, the controller 320 also controls the flow of data between various components of the system 300 as needed. In various exemplary embodiments, the memory 310 stores information coming into or going out of the system 300. In various exemplary embodiments, the memory 310 stores any necessary programs and/or data implementing the functions of the system 300, and/or stores data, such as, for example, an index of previously accessed document content information, at various stages of processing.

In various exemplary embodiments, the memory 310 is implemented using any appropriate combination of alterable, volatile or non-volatile memory or non-alterable, or fixed, memory. In various exemplary embodiments, the alterable memory, whether volatile or non-volatile, is implemented using any one or more of static or dynamic RAM, a floppy disk and disk drive, a writable or re-rewriteable optical disk and disk drive, a hard drive, flash memory or the like. Similarly, in various exemplary embodiments, the non-alterable or fixed memory is implemented using any one or more of ROM, PROM, EPROM, EEPROM, an optical ROM disk, such as a CD-ROM or DVD-ROM disk, and disk drive or the like.

In various exemplary embodiments, a client module performs various functions, selected from a list including, but not limited to, extracting text from one or more accessed documents, proactively transmitting the extracted text to a server module, proactively notifying a user of the existence of closely related previously accessed content found, providing an electronic connection to closely related previously accessed content found, providing an explicit history of the user's content found, accessed and/or retrieved, providing a digest generation component used to specify a digest to be generated by the server module, and other like functions.

In various exemplary embodiments, when determining associated previously accessed content information in response to a user action, such as when the user opens the document, the text extraction circuit or routine 305 in the client module automatically extracts the text being displayed. In various exemplary embodiments, the client module runs within the host application. In these exemplary embodiments, the client module has access to the currently displayed document, and thus easily extracts the text being displayed for further processing.

In various exemplary embodiments, following text extraction step, the proactive text transmission circuit or routine 315 in the client module proactively transmits the extracted text to the server module and thus to a server. In various exemplary embodiments, this transmission takes place whenever the user performs an action on the document, such as, for example, opening a new document, opening an existing document, looking at an email message, navigating to a new URL or the like. In various additional exemplary embodiments, periodic transmissions of the extracted text may take place while the user is composing a new document or an email message. In further exemplary embodiments, periodic transmissions of the extracted text take place while the user is editing existing documents, email messages, or other application documents.

In various exemplary embodiments, the purpose of text transmissions is twofold. First, it allows the server module to index the currently displayed text. Second, it allows the server module to search for previously accessed content that is closely related to the user's current context. In various exemplary embodiments, context is defined by the currently displayed page, the last n displayed pages, or other contextual information, such as, for example, time, location, appointments extracted from calendars, or the like.

In various exemplary embodiments, after a content transmission to the server module, the server module determines whether the server contains any previously accessed content that is closely related to the user's current context. If such content exists, the server module sends the information about the closely related previously accessed content back to a computing device generating client. In various exemplary embodiments, transmitted information includes, file names or URLs of the matching resources, page or document titles, access dates, as well as matching text segments. It should be appreciated that, because the server stores the full text of all transmissions, the server can retrieve previously accessed content, even if the original location of the content has changed. In various exemplary embodiments, any type of closely related previously accessed content is processed and transmitted back to the client module, and thus to the user computing device.

In various exemplary embodiments, access to, or indication of, previously seen content is provided through access/indication of previously seen content circuit or routine 325. In various exemplary embodiments, the client module informs or notifies the user of the existence of found related content. In various exemplary embodiments, the user then requests to see the received information. In various exemplary embodiments, the user opens a matching document, email message or web page.

In various exemplary embodiments, the access to previously seen content is implemented using a "history" button in a client toolbar. In various exemplary embodiments, the history button changes its appearance when the client module (and thus the user computing device) receives information about matching resources. In these exemplary embodiments, when the user clicks the history button, a menu providing access to the matching resources appears.

In various exemplary embodiments, the user refines the automated search that the server module performs to retrieve matching resources, for example, closely related previously seen content. For example, in various exemplary embodiments, the user specifies a specific date range, or modifies a similarity threshold to include remotely related results.

In various exemplary embodiments, another function performed by the client module is providing an interface for explicit access to the user's content history through explicit history access, circuit or routine 335. In various exemplary embodiments, the user uses the system's proactive querying capabilities to obtain a history of the previously accessed content. Alternatively, in various exemplary embodiments, the user employs a manual query to search for previously accessed content. In other various alternative embodiments, the client module provides explicit access to a list of recently accessed resources such as, for example, web pages, emails, documents or the like.

In addition to revisiting previously accessed content, in various exemplary embodiments, the client module includes a digest generation specification circuit or routine 345 used to specify a digest to be generated by the server module. Because users tend to access content related to many different activities and topics, in various exemplary embodiments, one aspect of this process is the specification of a topic or focus for the digest.

In various exemplary embodiments, similar to the revisitation approach, the topic or focus is provided by the user's current context, such as, for example, a currently displayed web page, research paper or email message. Alternatively, in various exemplary embodiments, users specify lists of URLs or files that contain representative text, or enter a textual query to focus the digest. In addition, in various exemplary embodiments, information about the desired length of summaries, the maximum number of documents to include, and/or the date range or file types of documents is included in the topic or focus.

In various exemplary embodiments, when the specification is sent to the server module, the server module starts the collection, summarization and document construction process to generate the digest. In various exemplary embodiments, the server module then notifies the client module when the newly generated document is ready to be displayed.

Other functions that provide for automatic context related content retrieval and/or information digest generation are within the scope of this invention. These functions, which are well known to those skilled in the art, are implemented using the client module in various exemplary embodiments.

In various exemplary embodiments, the server module persists, indexes and retrieves content, based on requests it receives from the client module. In addition, in various exemplary embodiments, the server module generates digest documents according to the user's specifications.

In various exemplary embodiments, the server module uses the content persistence and indexing circuit or routine 355 to maintain a database containing the full text of previously transmitted documents. In various exemplary embodiments, this further includes information, such as, one or more of metadata, such as, for example, path and URL information, file types, access dates, access frequency, or the like. In addition, in various exemplary embodiments, the server module incrementally builds a full-text index of all received content. In various exemplary embodiments, criteria of when to remove previously indexed content is specified.

In various exemplary embodiments, the query generation circuit or routine 365 uses an algorithm that allows the server module to convert a text fragment of arbitrary length into a weighted query. In various exemplary embodiments, the server module uses the weighted query to retrieve related content for revisitation support or digest generation.

In various exemplary embodiments, the server module retrieves previously indexed resources for both revisitation support and digest generation support. In various exemplary embodiments, when content is transmitted from the client, the server module generates a query, runs it against the full-text index and assigns a relevance score to the n best matches. In various exemplary embodiments, matches with relevance scores that exceed a specified threshold t are processed by the content recommendation for revisitation circuit or routine 375 in the server module. In various exemplary embodiments, matches with relevance scores that exceed a specified threshold t are then sent back to the client module to be presented to the user.

In various exemplary embodiments, when the digest generation circuit or routine 385 in the server module receives a digest generation request, the digest generation circuit or routine 385 retrieves documents that are related to the digest focus specified by the user. In various exemplary embodiments, when the user requested summaries to be included, the system summarizes the matching documents. Depending on the digest specification, in various exemplary embodiments, the system generates a document, such as, for example, a web page, that includes information describing the matching documents, such as, for example, URLs, titles, access dates or the like. Further, in various exemplary embodiments, the system also provides optional summaries and other information the user requested, such as, for example, including all images from matching documents. It should be appreciated that images from matching documents may be more useful than text depending on the user's task.

In various exemplary embodiments, content information includes for example, text, numbers, symbols, markings, meta data, or the like. Further, in various exemplary embodiments, content is part of a document such as, for example, a computer application document, a text message, an email message, a calendar entry, a web page, or the like. Moreover, in various exemplary embodiments, content to which the systems and methods of this invention are applied, are included within, or are, for example, entire pages, individual text characters contained within a page, words, phrases, text-lines, sentences, paragraphs, columns of text, blocks of text, text articles, multi-page documents, collections of single-page documents, collections of multi-page documents, or the like.

Figure 4:
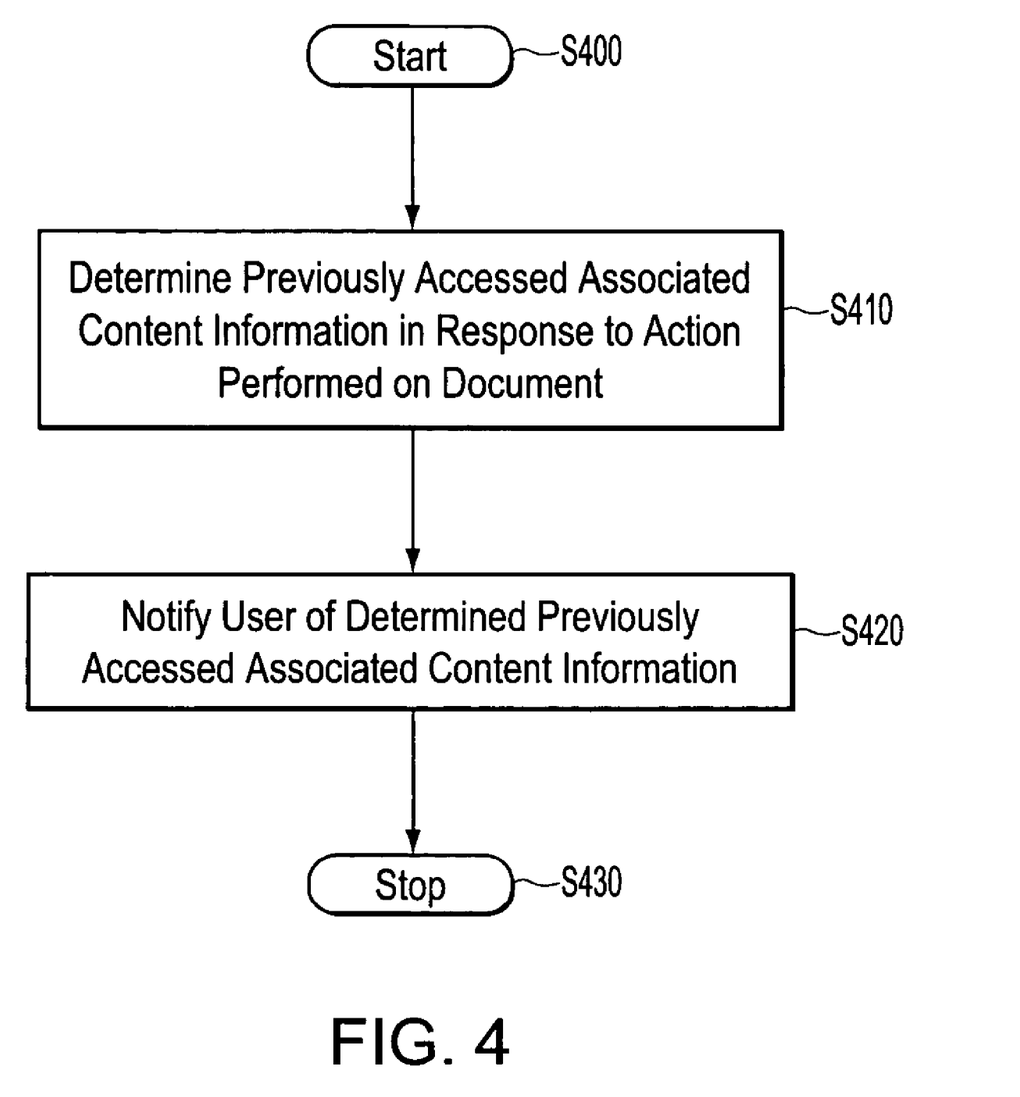
FIG. 4 is a flowchart outlining one exemplary embodiment of a method for revisiting previously accessed content information according to this invention.

FIG. 4 is a flowchart outlining one exemplary embodiment of a method for revisiting previously accessed content information according to this invention. As shown in FIG. 4, the method starts in step S400, and continues to step S410, where previously accessed associated content information is determined in response to an action performed on a document containing information. In various exemplary embodiments, the action includes one or more of a retrieve document action, an open document action, a save document action, a file document action, an edit document action, a delete document action, a forward document action and a bookmark document action. In various exemplary embodiments, other document actions that a user performs on a document, for example, when accessing, reviewing and/or the editing document, are within the scope of this invention, including those currently known and those later developed.

In various exemplary embodiments, previously accessed associated content information is determined based on the information included in the document being accessed. In various exemplary embodiments, this is done automatically. It should be appreciated that determined associated content information is typically a sub-part of a group of previously accessed content information documents that are stored in a media storage device. However, it should also be appreciated that this is not necessarily the case.

Then, in step S420, the user is notified of any determined previously accessed associated content information. In various exemplary embodiments, the notification includes at least activating a notification characteristic that indicates the availability of the associated content information determined to the user. In various exemplary embodiments, this is performed automatically. Operation then continues to step S430, where operation of the method stops.

Figure 5:
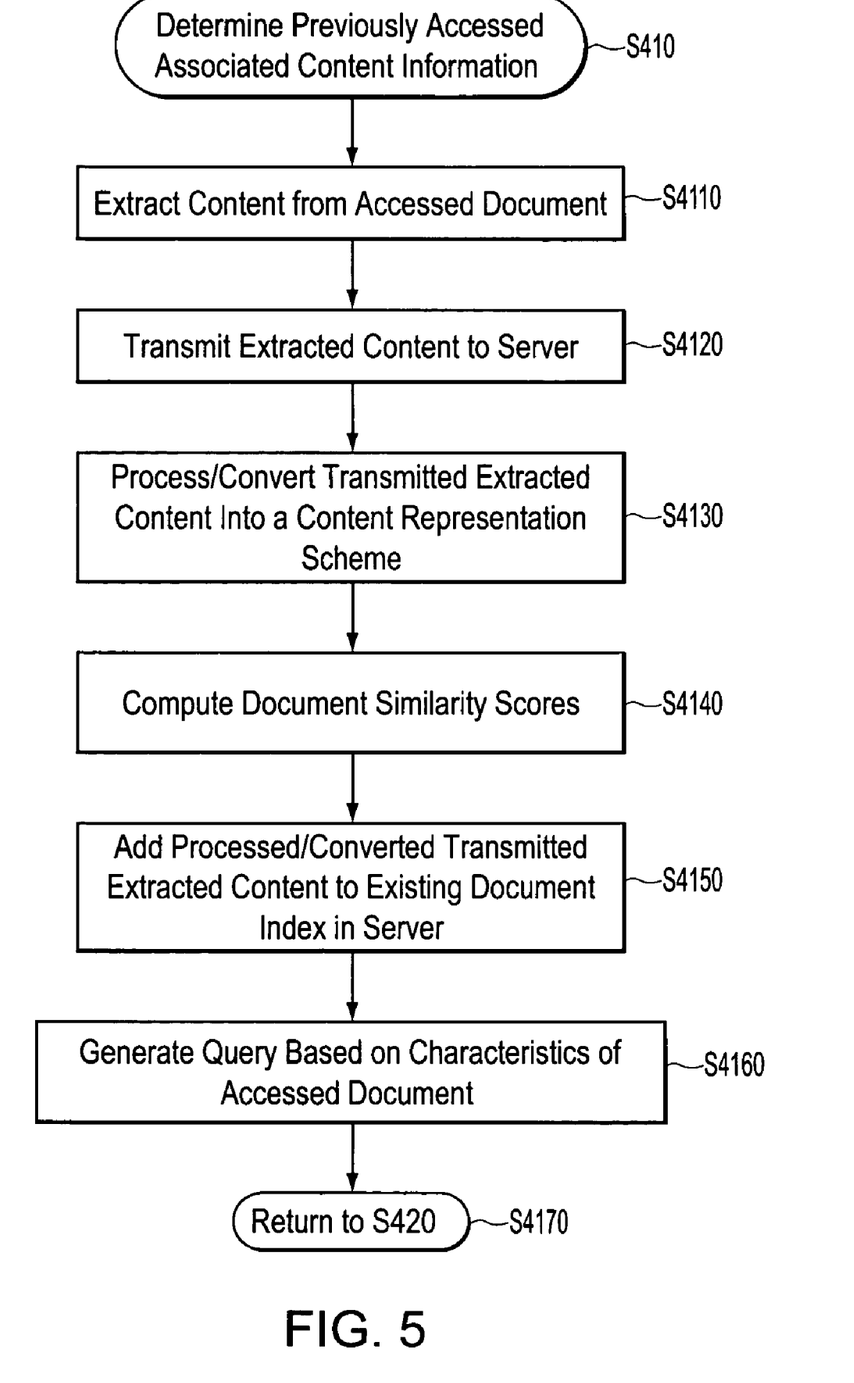
FIG. 5 is a flowchart outlining in more detail one exemplary embodiment of step S410 for use in connection with the methods and systems according to this invention.

FIG. 5 is a flowchart outlining in more detail one exemplary embodiment of step S410. In various exemplary embodiments, this is used to determine associated content information based on a context of the information included in the document being accessed. As shown in FIG. 5, the step S410 begins in sub-step S4110 where the content, such as, for example, text, of the currently displayed or accessed document is extracted for further processing. Next, in step S4120, the extracted content is transmitted to the server module for further processing.

In step S4130, the transmitted extracted content is processed or converted into a content representation scheme. In various exemplary embodiments involving text, sub-step S4130 is performed by using various algorithms or techniques based on text representations that support weighting of individual words as well as assessing the similarity of text documents. Other exemplary embodiments involving text use other algorithms or techniques in step S4130. In various exemplary embodiments involving text, the Vector Space Model is employed as a text representation scheme. The Vector Space Model is a text representation paradigm commonly used in information retrieval systems. However, in various exemplary embodiments, other models now known or later developed are used to perform this function. In various exemplary embodiments, the content is content other than text.

In the Vector Space Model, documents are represented as vectors of term weights, where each vector dimension corresponds to a term of the system's overall vocabulary, and each term weight quantifies the association between the term and the document. Term-weights are frequently based on the tf-idf term weighting scheme, that is, term-frequency/inverse document frequency. In this scheme, term weights are determined based on the number of times a term appears in the document (tf), and the number of times the term appears throughout the entire document collection (df).

In various exemplary embodiments, in order to determine the df values, the method uses all previously indexed content. Alternatively, in various exemplary embodiments, the method restricts the set of documents to documents accessed by the user versus all the users. In various other exemplary embodiments, the method restricts the documents based on retrieval date ranges.

To convert a text document to a term vector, in various exemplary embodiments, the systems and method according to this invention remove all formatting information, such as, for example, html tags, and then split the resulting text into individual terms.

In sub-step S4140, in various exemplary embodiments, to decide whether to include previously seen content in a set of revisitation suggestions or in a digest, the system according to this invention quantifies the similarity of documents. In various exemplary embodiments, once a document has been converted into a term vector, its similarity to another term vector is determined by normalizing the vectors and then taking the dot product. The resulting similarity score is commonly known as the cosine similarity measure. In various exemplary embodiments, the cosine similarity measure is used.

Sometimes, for reasons of computer processing efficiency, it is undesirable to compute the similarity between one document, for example the currently displayed document, and all other previously seen documents residing in the server. Thus, in various exemplary embodiments, not all similarity values are used. The goal of the similarity assessment is to find the n most similar documents, so that they can be used as revisitation suggestions or be included in digests. Thus, in various exemplary embodiments, the set of n most similar documents is efficiently approximated using an inverted index technique. This approximation is accomplished by converting the original document into a short query, which is then run against the inverted index of all previously seen documents. In these various exemplary embodiments, the returned documents are either treated as the final result set, or are compared to the original document to determine the exact similarity for more precise results. In various exemplary embodiments, a query is automatically generated by converting the original document to its tf-idf vector representation, sorting all terms by their respective term weights, and then restricting the query to the top n terms. In various exemplary embodiments, where the underlying retrieval engine supports weighted queries, the term weights are used as weights for individual query terms.

In sub-step S4150, the documents received by the server are added to the inverted index. This is advantageous to facilitate efficient retrieval of previously seen documents and to enable real-time revisitation suggestions. Operation then continues to sub-step S4160, where a query is generated based on characteristics of the accessed document. Operation then continues to step S4170, where operation of the method returns to step S420 in FIG. 4.

Figure 6:
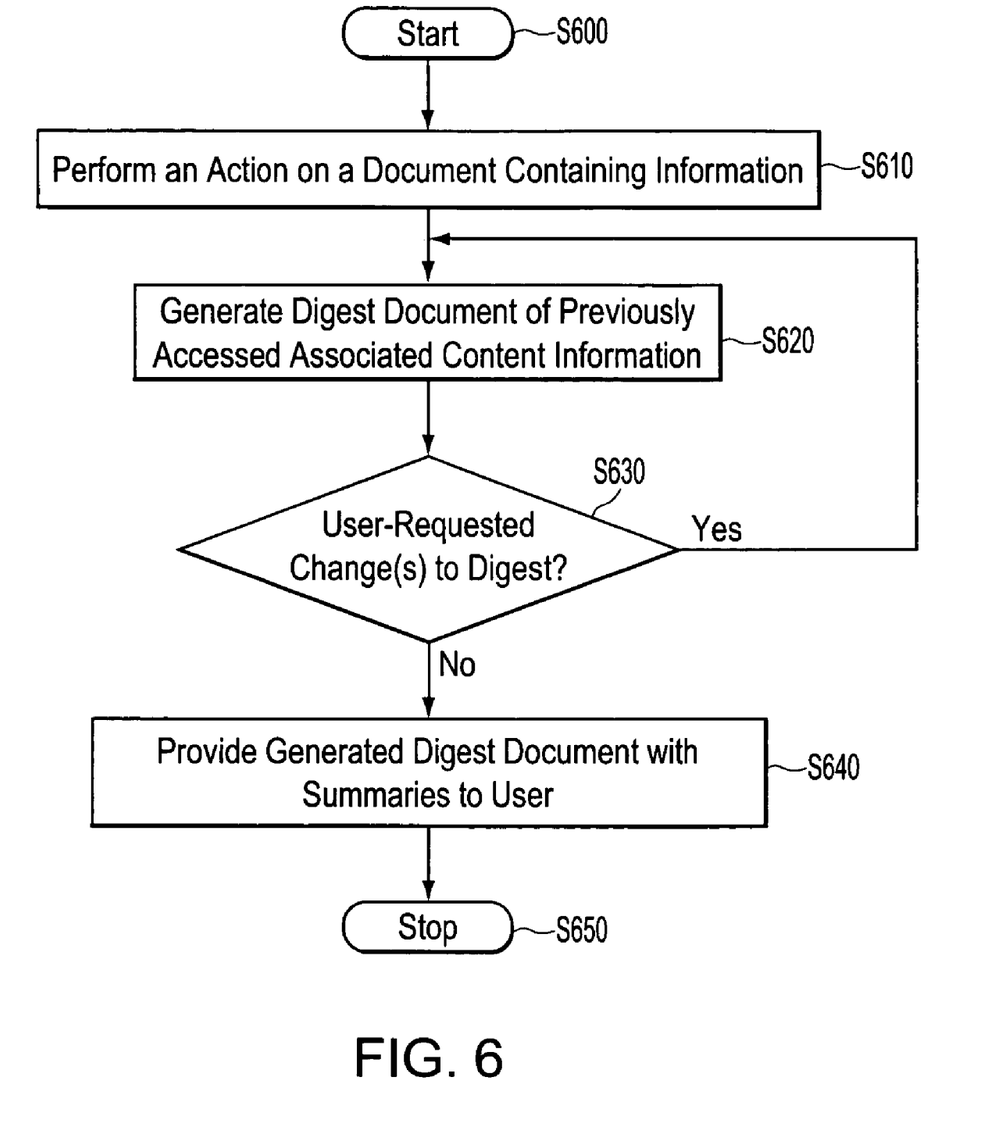
FIG. 6 is a flowchart outlining one exemplary embodiment of a method for generating focused digest documents based on previously accessed content according to this invention.

FIG. 6 is a flowchart outlining one exemplary embodiment of a method for generating focused digest documents based on previously accessed content according to this invention. As shown in FIG. 6, the method begins in step S600, and continues to step S610, where a user performs an action on a document containing information. In various exemplary embodiments, the action includes one or more of a retrieve document action, an open document action, a save document action, a file document action, an edit document action, a delete document action, a forward document action and a bookmark document action. In various exemplary embodiments, other document actions that a user performs on a document, for example, when accessing, reviewing and/or editing the document, are within the scope of this invention, including those currently known and those later developed.

Next, in step S620, a digest document of previously accessed associated content is generated. In various exemplary embodiments, this is based on currently displayed text characteristics. In various exemplary embodiments, digest document generation is performed using techniques similar to those employed for revisiting previously accessed content information, discussed above in connection with step S410. In various exemplary embodiments, all previously seen content that is similar to the user's context, such as, for example, a web page, an email message or another type of document, is retrieved using a query generation approach such as, for example, that described above in connection with sub-step S4160 and its previous sub-steps. Next, in various exemplary embodiments, a new document, for example, a web page, is compiled including document titles, references to the original document or the cached text, optional summaries and other information specified by the user to be included in the digest, such as, for example, access dates or images.

In various exemplary embodiments, step S610 may be omitted and the method may continue from step S600 directly to step S620, where a digest document of previously accessed associated content is generated in response to a user-defined digest specification.

In step S630, the user interactively guides the inclusion or exclusion of specific resources, or iteratively refines the generated document by modifying summarization parameters. In various exemplary embodiments, step S630 is excluded.

In various exemplary embodiments, the specification of a topic or focus for the digest is automatically provided. In various exemplary embodiments, the topic or focus for the digest is provided by the user's current context, such as a currently displayed web page, research paper or email message. Alternatively, in various exemplary embodiments, users specify lists of URLs or files that contain representative text, or enter a textual query to focus the digest. In addition, in various exemplary embodiments, information about the desired length of summaries, the maximum number of documents to include, and/or the date range or file types of documents is included.

In various exemplary embodiments, the digest generation component also provides for automatic summarization of documents by currently known or later developed techniques.

In various exemplary embodiments involving textual content, automatic summarization starts by selecting sentences from one or more documents based on properties of those sentences. In various exemplary embodiments, the sentences are included directly in the summary, and/or are analyzed and/or reformulated. In various exemplary embodiments, summaries are tailored to different purposes by adjusting their lengths or by giving more or less weight to the properties of the sentences. In various exemplary embodiments, summaries are also created that are oriented towards a particular subject or query, rather than being general.

In step S640, the generated digest, including the summaries, are then provided to the user. Operation then continues to step S650, where operation of the method stops.

This invention has been described in conjunction with the exemplary embodiments outlined above. Various alternatives, modifications, variations, and/or improvements are within the spirit and scope of the invention, whether known or presently unforeseen. Accordingly, the exemplary embodiments of the invention, as set forth above, are intended to be illustrative, not limiting. Various changes may be made without departing from the spirit and scope of the invention. Therefore, the invention is intended to embrace all known or later developed alternatives, modifications, variations and/or improvements.

What is claimed is:

1. A method of processing content information, the method comprising:
   automatically determining, based on information contained in a document currently being displayed by a user, an associated previously accessed content information, wherein said determining comprises:
   extracting at least a portion of the information contained in the document currently being displayed by the user;
   searching a previously accessed content for the associated previously accessed content information based on a context of the information contained in the currently displayed document, wherein the context of the information contained in the currently displayed document is determined by the at least a portion of the information extracted from the document currently being displayed the user; and
   transmitting the associated previously accessed content information to the user.

2. The method according to claim 1, further comprising processing the information in the document to include the information in the group of previously accessed content information.

3. The method according to claim 2, wherein processing the information comprises extracting the information from the document.

4. The method according to claim 3, wherein processing the information further comprises providing the extracted information to a media storage device.

5. The method according to claim 4, wherein providing the extracted information to the media storage device comprises periodically providing the extracted information to the media storage device.

6. The method according to claim 4, wherein the information is text information and processing the information further comprises converting the extracted information into a text representation scheme.

7. The method according to claim 6, wherein processing the information further comprises determining at least a similarity score qualifying the similarity of the converted information and previously accessed content.

8. The method according to claim 7, wherein processing the information further comprises additionally determining, from the group of previously accessed content information and the converted information, a set of content information having similarity scores exceeding a similarity threshold.

9. The method according to claim 8, wherein said additionally determining is performed using an inverted index technique.

10. The method according to claim 9, wherein said additionally determining comprises querying the index using an automatically generated text query, based on the converted information.

11. The method according to claim 9, wherein processing the information further comprises adding the converted information to an inverted index comprising the previously accessed content information.

12. The method according to claim 8, wherein processing the information further comprises determining a ranking of content information based at least on similarity scores.

13. The method according to claim 1, wherein the associated content information is part of at least a computer application document, a text message, an email message, a calendar entry or a web page.

14. The method according to claim 1, wherein the associated content information is selected from a group comprising at least: entire pages, individual text characters contained within a page, words, phrases, text-lines, sentences, paragraphs, columns of text, blocks of text, text articles, multi-page documents, collections of single-page documents, and collections of multi-page documents.

15. The method according to claim 1, wherein the associated previously accessed content information is determined regardless of the type of computer application.

16. The method according to claim 1, further comprising generating a digest document of the associated content information.

17. The method according to claim 16, further comprising creating a focused summary for the associated content information.

18. A machine-readable medium embodying instructions for processing information, instructions which, when executed by a processor, cause the processor to perform operations comprising:
   automatically determining, based on information contained in a document currently being displayed by a user, an associated previously accessed content information, wherein said determining comprises:
   extracting at least a portion of the information contained in the document currently being displayed by the user;
   searching a previously accessed content for the associated previously accessed content information based on a context of the information contained in the currently displayed document; wherein the context of the information contained in the currently displayed document is determined by the at least a portion of the information extracted from the document currently being displayed the user; and
transmitting the associated previously accessed content information to the user.

19. The machine-readable medium according to claim 18, further comprising processing the information in the document to include the information in the group of previously accessed content information.

20. The machine-readable medium according to claim 19, wherein processing the information comprises extracting the information from the document.

21. The machine-readable medium according to claim 20, wherein processing the information further comprises providing the extracted information to a media storage device.

22. The machine-readable medium according to claim 21, wherein providing the extracted information to the media storage device comprises periodically providing the extracted information to the media storage device.

23. The machine-readable medium according to claim 21, wherein the information is text information and processing the information further comprises converting the extracted information into a text representation scheme.

24. The machine-readable medium according to claim 23, wherein processing the information further comprises determining at least a similarity score quantifying the similarity of the converted information and previously accessed content.

25. The machine-readable medium according to claim 24, wherein processing the information further comprises additionally determining, from the group of previously accessed content information and the converted information, a set of content information having similarity scores exceeding a similarity threshold.

26. The machine-readable medium according to claim 25, wherein said additionally determining is performed using an inverted index technique.

27. The machine-readable medium according to claim 26, wherein said additionally determining comprises querying the index using an automatically generated text query, based on the converted information.

28. The machine-readable medium according to claim 26, wherein processing the information further comprises adding the converted information to an inverted index comprising the previously accessed content information.

29. The machine-readable medium according to claim 25, wherein processing the information further comprises determining a ranking of content information based at least on similarity scores.

30. The machine-readable medium according to claim 18, wherein the associated content information is part of at least a computer application document, a text message, an email message, a calendar entry or a web page.

31. The method according to claim 1, wherein the associated content information is selected from a group comprising at least: entire pages, individual text characters contained within a page, words, phrases, text-lines, sentences, paragraphs, columns of text, blocks of text, text articles, multi-page documents, collections of single-page documents, and collections of multi-page documents.

32. The method according to claim 1, wherein the associated previously accessed content information is determined regardless of the type of computer application.

33. The machine-readable medium according to claim 18, wherein said indicating comprises generating a digest document of the associated content information.

34. The machine-readable medium according to claim 18, further comprising creating a focused summary for the associated content information.

35. An information processing system comprising: a memory; and a controller operable to:
   automatically determining, based on information contained in a document currently being displayed by a user, an associated previously accessed content information, wherein said determining comprises:
   extracting at least a portion of the information contained in the document currently being displayed by the user;
   searching a previously accessed content for the associated previously accessed content information based on a context of the information contained in the currently displayed document; wherein the context of the information contained in the currently displayed document is determined by the at least a portion of the information extracted from the document currently being displayed the user; and transmitting the associated previously accessed content information to the user.

36. The system according to claim 35, further comprising a client module and a server module.

37. The system according to claim 36, wherein at least the client module is embedded into an application used to access the document containing information.

38. The system according to claim 35, further comprising processing the information in the document to include the information in the group of previously accessed content information.

39. The system according to claim 38, wherein processing the information comprises extracting the information from the document.

40. The system according to claim 39, wherein processing the information further comprises providing the extracted information to a media storage device.

41. The system according to claim 40, wherein providing the extracted information to the media storage device comprises periodically providing the extracted information to the media storage device.

42. The system according to claim 40, wherein the information is text information and processing the information further comprises converting the extracted information into a text representation scheme.

43. The system according to claim 42, wherein processing the information further comprises determining at least a similarity score quantifying the similarity of the converted information and previously accessed content.

44. The system according to claim 43, wherein processing the information further comprises additionally determining, from the group of previously accessed content information and the converted information, a set of content information having similarity scores exceeding a similarity threshold.

45. The system according to claim 44, wherein said additionally determining is performed using an inverted index technique.

46. The system according to claim 45, wherein said additionally determining comprises querying the index using an automatically generated text query, based on the converted information.

47. The system according to claim 45, wherein processing the information further comprises adding the converted information to an inverted index comprising the previously accessed content information.

48. The system according to claim 44, wherein processing the information further comprises determining a ranking of content information based at least on similarity scores.

49. The system according to claim 35, wherein the associated content information is part of at least a computer application document, a text message, an email message, a calendar entry or a web page.

50. The method according to claim 1, wherein the associated content information is selected from a group comprising at least: entire pages, individual text characters contained within a page, words, phrases, text-lines, sentences, paragraphs, columns of text, blocks of text, text articles, multi-page documents, collections of single-page documents, and collections of multi-page documents.

51. The method according to claim 1, wherein the associated previously accessed content information is determined regardless of the type of computer application.

52. The system according to claim 35, wherein said indicating comprises generating a digest document of the associated content information.

53. The system according to claim 52, further comprising creating a focused summary for the associated content information.

54. A machine-readable medium in a client module, the machine-readable medium embodying instructions for processing information, instructions, which, when executed by a processor, cause the processor to perform operations comprising:

extracting text from one or more accessed documents currently being displayed by a user;

proactively transmitting the extracted text to a server module;

proactively automatically determining previously accessed content information associated with the extracted text wherein said determining comprising:

searching a previously accessed content for the associated previously accessed content information based on a context of the information contained in the currently displayed document; wherein the context of the information contained in the currently displayed document is determined by the at least a portion of the text extracted from the document currently being displayed the user; and transmitting the associated previously accessed content information to the user based on a response received from the server module.

55. The machine-readable medium of claim 54 further comprising providing an electronic connection to the determined associated content information.

56. The machine-readable medium of claim 54, wherein the client module is embedded into a host computer application.

57. The machine-readable medium of claim 54, wherein the client module and the server module are provided on separate computing devices.

* * * * *